(12) United States Patent
Brown et al.

(10) Patent No.: US 11,222,555 B1
(45) Date of Patent: Jan. 11, 2022

(54) SPHERICAL DISPLAY SYSTEM

(71) Applicant: Rockwell Collins, Inc., Cedar Rapids, IA (US)

(72) Inventors: Todd M. Brown, Cedar Rapids, IA (US); Donald E. Mosier, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/506,436

(22) Filed: Jul. 9, 2019

(51) Int. Cl.
*G09F 9/30* (2006.01)
*H04N 13/302* (2018.01)
*G09F 9/305* (2006.01)
*G09F 9/302* (2006.01)

(52) U.S. Cl.
CPC ............. *G09F 9/301* (2013.01); *G09F 9/302* (2013.01); *G09F 9/305* (2013.01); *H04N 13/302* (2018.05)

(58) Field of Classification Search
CPC combination set(s) only.
See application file for complete search history.

(56) References Cited

U.S. PATENT DOCUMENTS

| | | | |
|---|---|---|---|
| 5,589,956 A * | 12/1996 | Morishima | G02B 5/32 345/7 |
| 6,211,457 B1 * | 4/2001 | Cama | H05K 9/0018 174/380 |
| 2017/0115489 A1 * | 4/2017 | Hu | G06T 3/0093 |
| 2018/0217393 A1 * | 8/2018 | Richards | H01L 27/3293 |
| 2018/0217632 A1 * | 8/2018 | Tseng | G06F 1/163 |
| 2019/0091520 A1 * | 3/2019 | Corbeil | A63B 41/08 |
| 2020/0168133 A1 * | 5/2020 | Hwang | G09G 3/3208 |

FOREIGN PATENT DOCUMENTS

CN 106297567 A * 1/2017

* cited by examiner

*Primary Examiner* — Andrew G Yang
(74) *Attorney, Agent, or Firm* — Suiter Swantz pc llo

(57) ABSTRACT

A display includes a plurality of light emissive panels. Each light emissive panel is flexible, has a light emissive surface with a plurality of pixels emitting light, has side edges, and is adjacent to other light emissive panels. The light emissive panels are in a flexed arrangement such that a total light emissive surface includes individual of the light emissive surfaces having a substantially full sphere surface or partial sphere surface shape.

12 Claims, 6 Drawing Sheets

SPHERICAL DISPLAY SYSTEM

BACKGROUND

Immersive training/simulation display systems may include optical systems projecting images on a curved screen. In many applications the curved screen has a partially spherical surface shape, i.e. a shape of a partial sphere surface, with the viewer positioned within the sphere to view the screen. The curved screen receives light from outside the screen, such as outside of the partial sphere surface, where the light from projectors is projected on the screen, and viewed by the viewer.

Often several projectors are required to respectively provide images on several different regions of the curved screen so that the entire screen displays an image. The requirement for several projectors can substantially increase the cost and size for the display system.

SUMMARY

In one aspect, embodiments of the inventive concepts disclosed herein are directed to a display. The display includes a plurality of light emissive panels, each light emissive panel being flexible, having a light emissive surface with a plurality of pixels emitting light, having side edges, and being adjacent to each other. The light emissive panels are in a flexed arrangement such that a total light emissive surface including individual of the light emissive surfaces has a substantially full sphere surface or partial sphere surface shape.

In a further aspect, embodiments of the inventive concepts disclosed herein are directed to a display system. The display system includes a display and a display support. The display includes a plurality of light emissive panels. Each light emissive panel is flexible, has a light emissive surface with a plurality of pixels emitting light, has side edges, and is adjacent to each other. The light emissive panels are in a flexed arrangement such that a total light emissive surface including individual of the light emissive surfaces has a substantially full sphere surface or partial sphere surface shape. The display support is arranged to support the display, the light emissive surfaces facing an inside of the substantially full sphere surface or partial sphere surface shape.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regard a display system using flexed light emissive panels. The light emissive panels are flexed (bent) such that their collective light emissive surfaces are substantially in a full sphere surface or partial sphere surface shape.

The display system using flexed emissive light panels provides a display system which is more compact in size than projector based display systems. Furthermore, costs can be reduced with a display system deploying the flexible emissive light panels.

Figure 1:
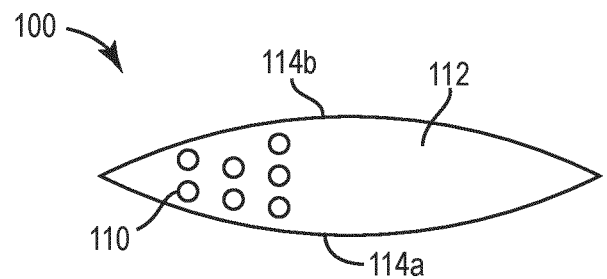
FIG. 1 illustrates a front view of a flexible light emissive panel according to inventive concepts disclosed herein.

FIG. 1 illustrates a front view of a light emissive panel 100 according to the inventive concepts disclosed herein, where the light emissive panel is in an unflexed (unbent) arrangement. The light emissive panel 100 may include a plurality of pixels 110, which emit light. FIG. 1 illustrates only a relatively small number of pixels 110 for ease of illustration. In practice the number of pixels 110 may be much larger than the number shown in FIG. 1.

The light emissive panel 100 includes a light emissive surface 112, which includes the plurality of pixels 110. The pixels 110 of the light emissive surface 112 emit light which may be viewed by a viewer.

The light emissive panel 100 in FIG. 1 has edges 114*a* and 114*b*, where the edges may be opposed to each other. According to inventive concepts disclosed herein, the edges 114*a* and 114*b* may be curved. For example, as shown in FIG. 1, the edges 114*a* and 114*b* are curved such that the light emissive panel 100 has a convex shape.

The light emissive panel 100 in FIG. 1 may include, for example, an organic light emitting diode (OLED) display, a liquid crystal display (LCD), or micro light emitting diode display. The light emissive panel 100 is flexible such that it may be flexed (bent) about the vertical axis in FIG. 1, such that the light emissive panel 100 may have substantially a shape of a portion of a surface of a sphere.

Figure 2:
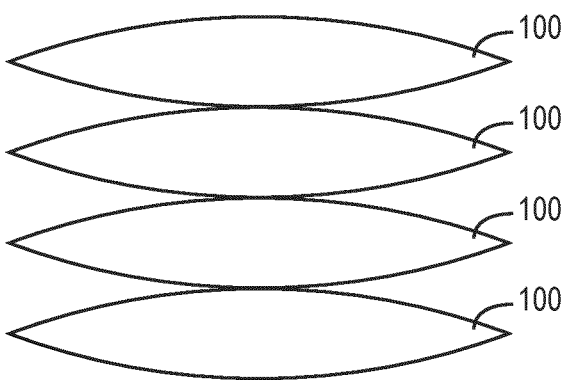
FIG. 2 illustrates a front view of an arrangement where a plurality of flexible light emissive panels are arranged in an unflexed flat arrangement according to inventive concepts disclosed herein.

FIG. 2 illustrates a front view of an arrangement where a plurality of light emissive panels 100 are arranged with respect to each other in an unflexed flat arrangement. Adjacent edges of the light emissive panels 100 may contact each other.

Figure 3:
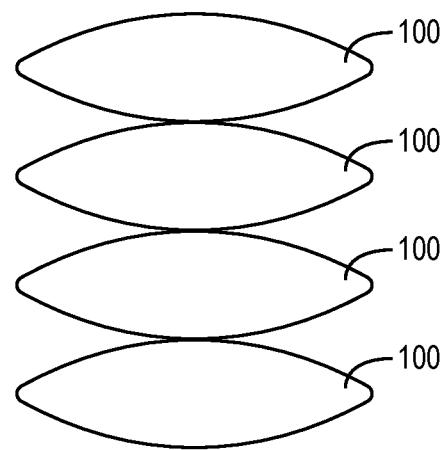
FIG. 3 illustrates a front view of an arrangement where a plurality of flexible light emissive panels are arranged in a flexed arrangement according to inventive concepts disclosed herein.

FIG. 3 illustrates a front view of an arrangement where a plurality of light emissive panels 100 are arranged with respect to each other in a partially flexed arrangement. In FIG. 3 the panels 100 are flexed about the vertical axis.

Figure 4:
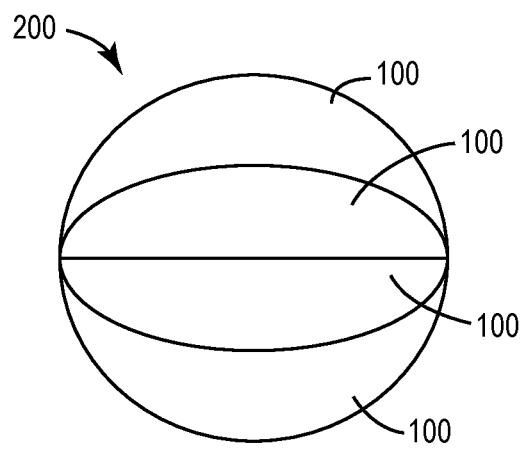
FIG. 4 illustrates a front view of an arrangement where a plurality of flexible light emissive panels are arranged in a flexed arrangement so that the flexible light emissive panels are along a spherical surface shape according to inventive concepts disclosed herein.

FIG. 4 illustrates a front view of a display 200 where a plurality of light emissive panels 100 are arranged with respect to each other in a flexed arrangement where a total light emissive surface including the individual light emissive surfaces 112 has a substantially partial sphere surface shape. That is, the individual light emissive surfaces 112 are flexed such that they substantially follow the surface of a sphere. Adjacent edges of the light emissive panels 100 may contact each other.

As shown in FIGS. 2-4, the individual light emissive panels 100 may be bent about the vertical axis. That is, the left and right edges of a light emissive panel 100 are bent about the vertical axis. When the light emissive panels 100 are in a bent arrangement, the panels 100 may be tilted so that adjacent of the panels 100 contact each other. For example, a top edge of a lower panel may contact an adjacent bottom edge of an adjacent upper panel. As a result, as shown in FIG. 4, the individual light emissive surfaces 112 are flexed such that they substantially follow the surface of a sphere.

Figure 5:
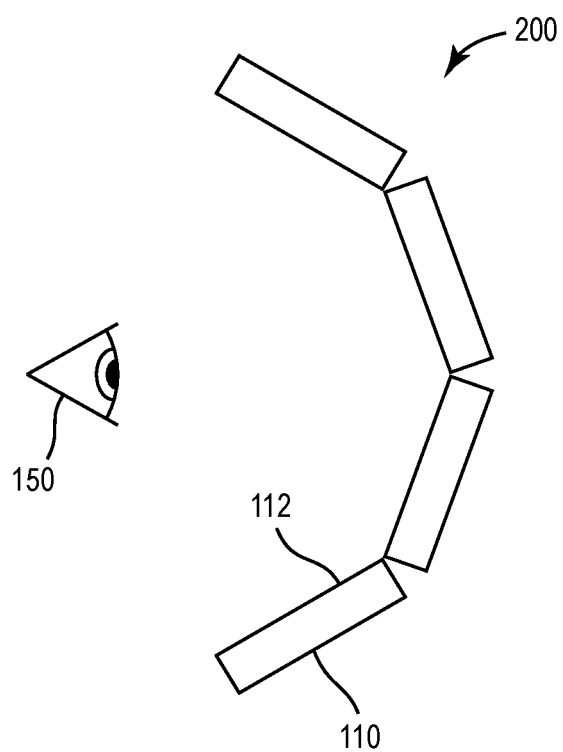
FIG. 5 illustrates a side cross-section view of the arrangement of FIG. 4 according to inventive concepts disclosed herein.

FIG. 5 illustrates a side view of the arrangement of a plurality of light emissive panels 100 of FIG. 4, in a cross-section along the vertical of FIG. 5. FIG. 5 illustrates a viewer 150 where the viewer may view the light emissive panels 100 from a point at or near the center of the sphere.

Referring to FIGS. 1 and 4, the light emissive panels 100 may be shaped to better approximate a spherical surface when in the flexed arrangement. In this regard, the light emissive panels 100 may be larger in number and shorter in width from edge 114a to edge 114b. Such an arrangement of the light emissive panels 100 when in the flexed arrangement may better approximate a spherical surface.

Figure 6:
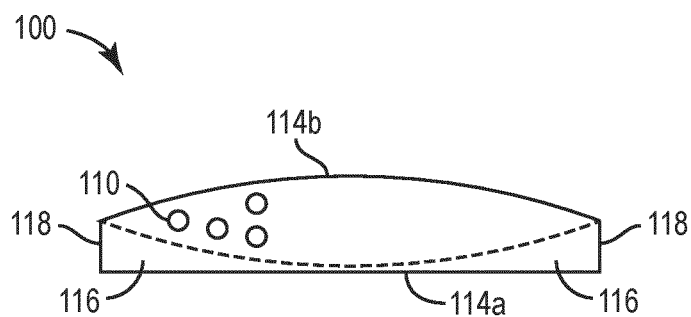
FIG. 6 illustrates a front view of a flexible light emissive panel with a curved side opposing a flat side according to inventive concepts disclosed herein.

FIG. 6 is a schematic illustrating a front view of a light emissive panel 100 according to the inventive concepts disclosed herein, where the light emissive panel is in an unflexed (unbent) arrangement. The light emissive panel 100 may include a plurality of pixels 110, which emit light. FIG. 6 illustrates only a relatively small number of pixels 110 for ease of illustration. In practice the number of pixels 110 may be much larger than the number shown in FIG. 6.

The embodiments according to FIG. 6 are similar to those of FIG. 1, and similar reference characters refer to the same features, except that in FIG. 6 only one of the edges of the light emissive panel 100 is curved, while an opposing edge is straight. The light emissive panel 100 in FIG. 6 has edges 114a and 114b, where the edges may be opposed to each other. According to inventive concepts disclosed herein, in the arrangement of FIG. 6 the edge 114a is straight, while the opposing edge 114b may be curved.

Figure 7:
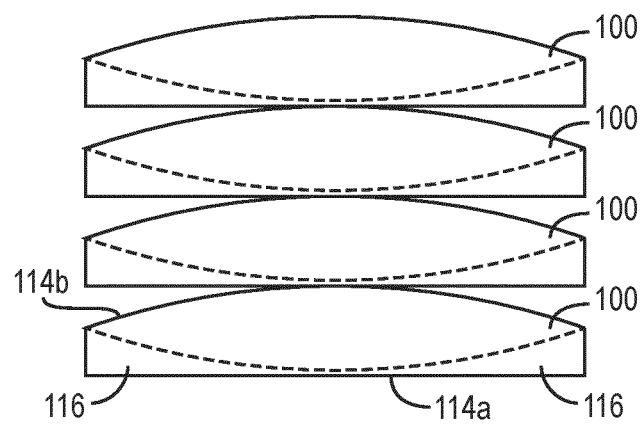
FIG. 7 illustrates a front view of an arrangement where a plurality of flexible light emissive panels with a curved side opposing a flat side are arranged in an unflexed flat arrangement according to inventive concepts disclosed herein.

FIG. 7 illustrates a front view of an arrangement where the plurality of light emissive panels 100 of FIG. 6 are arranged with respect to each other in an unflexed flat arrangement. Adjacent of the light emissive panels 100 may contact each other. As can be seen in FIG. 7, the light emissive panels 100 have corner regions 116, where the edge 114a intersects sides 118 of the light emissive panels. The extent of the corner regions 116 is demarcated in part by the dotted lines in FIG. 7.

Figure 8:
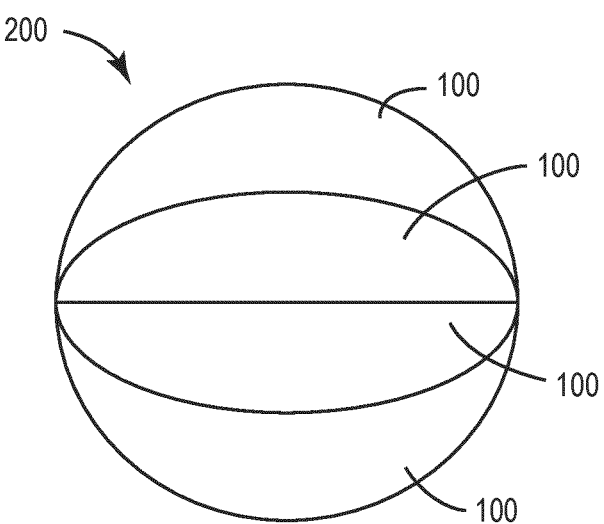
FIG. 8 illustrates a front view of an arrangement where a plurality of flexible light emissive panels with a curved side opposing a flat side are arranged in a flexed arrangement so that the flexible light emissive panels are along a spherical surface shape according to inventive concepts disclosed herein.

FIG. 8 illustrates a front view of a display 200 where a plurality of light emissive panels 100 of FIG. 6 are arranged with respect to each other in a flexed arrangement where a total light emissive surface including the individual light emissive panels 100 has a substantially partial sphere surface shape. That is, the individual light emissive panels 100 are flexed such that they substantially follow the surface of a sphere. Adjacent of the light emissive panels 100 may contact each other at their edges 114a and 114b.

Further, according to inventive concepts shown in FIG. 8, corner regions 116 of at least some of the light emissive panels 100 overlap with adjacent light emissive panels 100 when the panels 100 are in the flexed arrangement of FIG. 8. In this way, the light emissive surface of the corner regions 116 may be blocked by an adjacent light emissive panel over the region of overlap.

Figure 9:
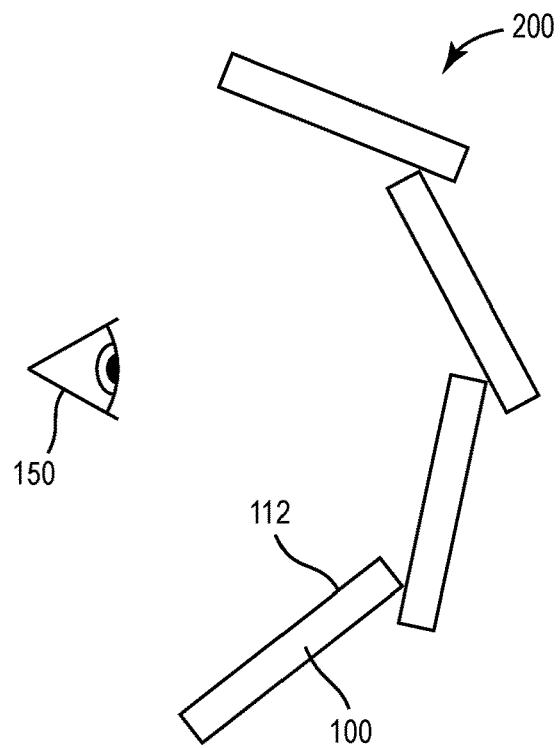
FIG. 9 illustrates a side cross-section view of the arrangement of FIG. 8 according to inventive concepts disclosed herein.

FIG. 9 illustrates a side view of the arrangement of a plurality of light emissive panels 100 of FIG. 8, in a cross-section along the vertical of FIG. 8. FIG. 9 illustrates a viewer 150 where the viewer may view light emissive surfaces 112 of the light emissive panels 100 from a point at or near the center of the sphere.

Figure 10:
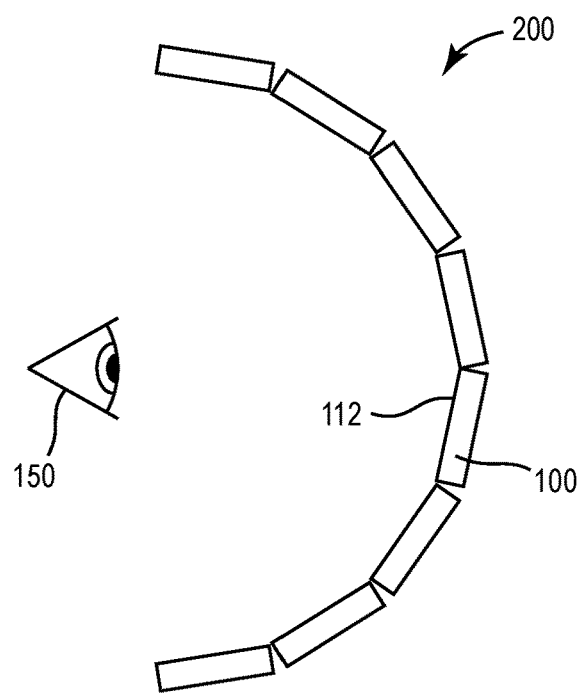
FIG. 10 illustrates a side cross-section view of an arrangement of flexible light emissive panels according to inventive concepts disclosed herein.

FIG. 10 illustrates a side cross-section view of the arrangement of flexible light emissive panels 100 according to inventive concepts disclosed herein. The arrangement of FIG. 10 differs from that in FIG. 9, in that the number of light emissive panels 100 is greater in FIG. 10, thus creating better approximation of a sphere or sphere portion.

Figure 11:
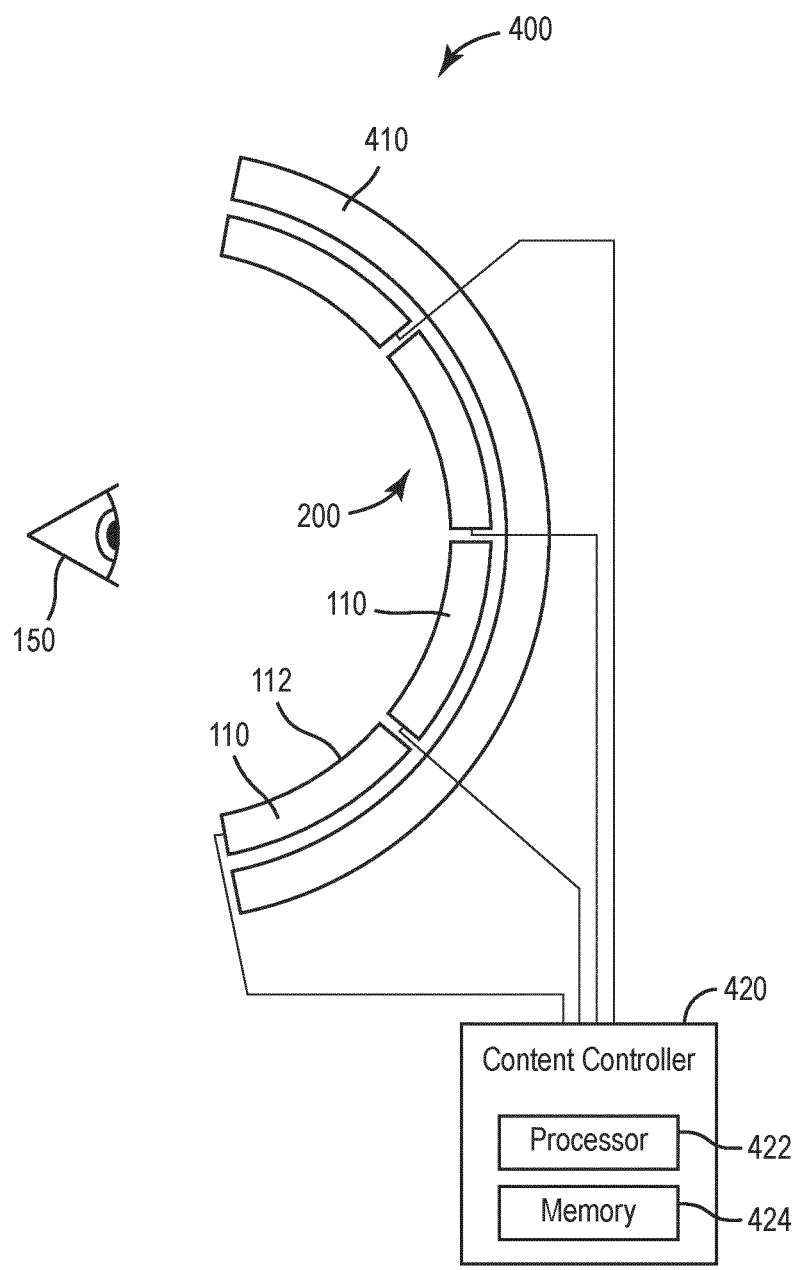
FIG. 11 is a schematic illustrating a display system according to inventive concepts disclosed herein.

FIG. 11 is a schematic illustrating a display system 400 according to inventive concepts disclosed herein. The display system 400 includes a display 200 where a plurality of light emissive panels 100 are arranged, such as in the configuration of FIG. 4 or 8, for example. The light emissive panels 100 are in a flexed arrangement such that a total light emissive surface comprising individual of the light emissive surfaces 112 has a substantially full sphere surface or partial sphere surface shape.

The display system 400 may include a display support 410, which is arranged to support the display 200. The display support 410 may include a molded ball or a frame support, for example. The display support 410 may be arranged on the outside of the display 200 relative to a user so that the display support 410 does not block the view of a viewer.

The display system 400 may include a content controller 420. The content controller 420 provides content to the light emissive panels 100 of the display 200. The content may include, for example, text or image content. The content controller 420 may be connected to each of the light emissive panels 100 as shown in FIG. 12.

The content controller may include a processor 422 and a memory 424. The memory 424 may store content to be provided to the light emissive panels 100. The processor 422 of the content controller 420 may perform operations on the stored content. For example, the processor 422 may map the content to the light emissive panels 100 to provide a continuous image by the display 200.

The display system 400 may be employed in a variety of applications. For example, the display system 400 may be used in training/simulation, trade show demonstrations, airborne applications, or in a gaming environment.

Embodiments of the inventive concepts disclosed herein regard a display system using flexed light emissive panels. The light emissive panels are flexed (bent) such that their collective light emissive surfaces are substantially in a full sphere surface or partial sphere surface shape.

The display system using flexed emissive light panels provides a display system which is more compact in size than projector based display systems. Furthermore, costs can be reduced with a display system deploying the flexible emissive light panels.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A display, comprising:
a plurality of light emissive panels, each light emissive panel being flexible such that each light emissive panel is configured to bend about a vertical axis, having a light emissive surface with a plurality of pixels configured to emit light, having opposing edges, and being adjacent to at least one of the plurality of light emissive panels,
the plurality of light emissive panels being in a flexed arrangement such that a total light emissive surface comprising individual of the light emissive surfaces has a substantially full sphere surface or partial sphere surface shape, wherein the light emissive surfaces face an inside of the substantially full sphere surface or partial sphere surface shape, wherein each of the light emissive panels is bent about the vertical axis in the flexed arrangement; wherein the opposing edges of each of the light emissive panels in an unflexed flat arrangement include a straight edge and an opposing edge which is curved; wherein the light emissive surfaces of at least some of adjacent of the light emissive panels partially overlap in a corner region of the light emissive panels, the corner region defined by where the straight edge intersects with a side of the light emissive panels.

2. The display of claim 1, wherein the opposing edges are arranged substantially perpendicular to the vertical axis in the flexed arrangement.

3. The display of claim 1, wherein the total light emissive surface has substantially a partial sphere surface shape.

4. The display of claim 1, wherein the light emissive panels include at least one of organic light emitting diode, liquid crystal, or micro light emitting diode displays.

5. The display of claim 1, wherein the substantially partial sphere surface shape subtends an angle greater than a hemisphere surface.

6. The display of claim 1, wherein the light emissive panels provide a stereoscopic three-dimensional image.

7. A display system, comprising:
a display comprising
a plurality of light emissive panels, each light emissive panel being flexible such that each light emissive panel is configured to bend about a vertical axis, having a light emissive surface with a plurality of pixels configured to emit light, having opposing edges, and being adjacent to at least one of the plurality of light emissive panels,
the plurality of light emissive panels being in a flexed arrangement such that a total light emissive surface comprising individual of the light emissive surfaces has a substantially full sphere surface or partial sphere surface shape; and
a display support arranged to support the display, the light emissive surfaces facing an inside of the substantially full sphere surface or partial sphere surface shape, wherein each of the light emissive panels is bent about the vertical axis in the flexed arrangement;
wherein the opposing edges of each of the light emissive panels in an unflexed flat arrangement include a straight edge, and an opposing edge which is curved; wherein the light emissive surfaces of at least some of adjacent of the light emissive panels partially overlap in a corner region of the light emissive panels, the corner region defined by where the straight edge intersects with a side of the light emissive panels.

8. The display system according to claim 7, further comprising
a content controller configured to provide content to the display, the content including at least one of image content and text.

9. The display system according to claim 8, wherein the content controller is configured to map the content to the light emissive panels to provide a continuous image by the display.

10. The display system of claim 7, wherein the light emissive panels provide a stereoscopic three-dimensional image.

11. The display system of claim 7, wherein the substantially partial sphere surface shape subtends an angle greater than a hemisphere surface.

12. The display system of claim 7, wherein the light emissive panels provide a stereoscopic three-dimensional image.

* * * * *